(12) United States Patent
Seacat et al.

(10) Patent No.: US 10,974,574 B2
(45) Date of Patent: Apr. 13, 2021

(54) SCREEN ASSEMBLY FOR A WORK VEHICLE CAB

(71) Applicant: CNH Industrial America LLC, New Holland, PA (US)

(72) Inventors: Daniel Owen Seacat, Valley Center, KS (US); David Robert Natzke, Wichita, KS (US)

(73) Assignee: CNH Industrial America LLC, New Holland, PA (US)

( * ) Notice: Subject to any disclaimer, the term of this patent is extended or adjusted under 35 U.S.C. 154(b) by 251 days.

(21) Appl. No.: 15/816,183

(22) Filed: Nov. 17, 2017

(65) Prior Publication Data

US 2019/0152300 A1 May 23, 2019

(51) Int. Cl.
*B60J 1/10* (2006.01)
*B62D 33/06* (2006.01)
*B60J 1/20* (2006.01)

(52) U.S. Cl.
CPC ............... *B60J 1/10* (2013.01); *B60J 1/2094* (2013.01); *B62D 33/0617* (2013.01)

(58) Field of Classification Search
CPC ............... B62D 33/0617; B62D 33/06; B62D 33/0604; B62D 33/0633; B62D 25/02; B62D 25/06; B60J 1/004; B60J 10/00; B60J 10/0071; B60J 1/007; B60J 1/008; B60J 1/02; B60J 1/04
USPC ..... 296/190.8, 102, 187.03, 1.09, 96.15, 72, 296/64, 3, 210, 205, 196.02; 180/291, 180/89.12, 296, 333, 376, 377, 89.19, 180/68.4; 29/897.2, 428, 401.1, 434; 297/216.17, 411.21, 463.1, 468
See application file for complete search history.

(56) References Cited

U.S. PATENT DOCUMENTS

| | | | |
|---|---|---|---|
| 3,808,742 A | 5/1974 | Ehret et al. | |
| 4,124,054 A * | 11/1978 | Spretnjak | B60J 1/1853 160/90 |
| 6,149,228 A * | 11/2000 | O'Neill | B60R 21/131 296/190.01 |
| 7,758,104 B2 * | 7/2010 | Liebl | B60J 5/02 296/146.2 |
| 8,091,955 B2 | 1/2012 | Hill et al. | |
| 8,429,865 B2 * | 4/2013 | Nania | B60J 1/10 296/146.16 |
| 2001/0008346 A1 * | 7/2001 | Martin, Jr. | B60J 1/02 296/190.08 |
| 2007/0056701 A1 * | 3/2007 | Brooker | E06B 9/52 160/381 |

(Continued)

FOREIGN PATENT DOCUMENTS

| | | |
|---|---|---|
| CA | 2239610 | 12/1999 |
| WO | 0117843 | 3/2001 |

*Primary Examiner* — D Glenn Dayoan
*Assistant Examiner* — Sunsurraye Westbrook
(74) *Attorney, Agent, or Firm* — Peter Zacharias; Patrick Sheldrake (57) ABSTRACT

A screen assembly for a work vehicle cab includes a screen configured to cover at least a portion of an opening in the work vehicle cab. The screen assembly also includes a frame having at least one window channel and a screen channel. The at least one window channel is configured to support at least one window, the screen channel is configured to receive the screen, and the frame extends about a portion of a periphery of the opening.

14 Claims, 5 Drawing Sheets

(56) References Cited

U.S. PATENT DOCUMENTS

2013/0228296 A1* 9/2013 Smith ................ E05B 17/2038
160/371
2014/0027074 A1* 1/2014 Houlihan ................ E06B 9/52
160/381

* cited by examiner

SCREEN ASSEMBLY FOR A WORK VEHICLE CAB

BACKGROUND

The present disclosure relates generally to a screen assembly for a work vehicle cab.

Certain work vehicles (e.g., tractors, harvesters, skid steers, etc.) include a cab configured to house an operator. The cab typically includes a frame having openings configured to enable the operator to view the surrounding environment. A screen is typically positioned over a substantial portion of each opening to block objects (e.g., construct debris, rocks, tree limbs, etc.) from entering the cab and to block the operator from exiting the cab through the opening. Certain work vehicles include one or more windows positioned within each opening (e.g., inward from the respective screen relative to an interior of the cab). The window(s) may be coupled to the frame of the cab by a frame that extends around the opening.

The screen is typically coupled to the cab frame by a welded connection and/or by multiple fasteners (e.g., rivets, etc.). Unfortunately, the process of sequentially coupling the window frame and the screen to the cab frame may result in significant work vehicle manufacturing costs. In addition, the process of removing the screen (e.g., to access the window(s)) may be time consuming and expensive. For example, a technician may grind through the welded connection and/or drill/grind through the fasteners to remove the screen.

BRIEF DESCRIPTION

In one embodiment, a screen assembly for a work vehicle cab includes a screen configured to cover at least a portion of an opening in the work vehicle cab. The screen assembly also includes a frame having at least one window channel and a screen channel. The at least one window channel is configured to support at least one window, the screen channel is configured to receive the screen, and the frame extends about a portion of a periphery of the opening.

In another embodiment, a screen assembly for a work vehicle cab includes a screen configured to cover a substantial portion of an opening in the work vehicle cab. The screen assembly also includes a frame having at least one window channel and a screen channel. The at least one window channel is configured to support at least one window, the screen channel is configured to support the screen, and the frame extends about a portion of a periphery of the opening.

In a further embodiment, a screen assembly for a work vehicle cab includes a screen configured to cover at least a portion of an opening in the work vehicle cab. The screen assembly also includes a first frame having at least one window channel and a screen channel. The at least one window channel of the first frame is configured to support at least one window, the screen channel of the first frame is configured to receive the screen, and the first frame extends about a first portion of a periphery of the opening. In addition, the screen assembly includes a second frame having at least one window channel. The at least one window channel of the second frame is configured to support the at least one window, and the second frame extends about a second portion of the periphery of the opening. The screen assembly also includes a fastening assembly configured to couple the screen to the second frame to block movement of the screen relative to the first frame and the second frame.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
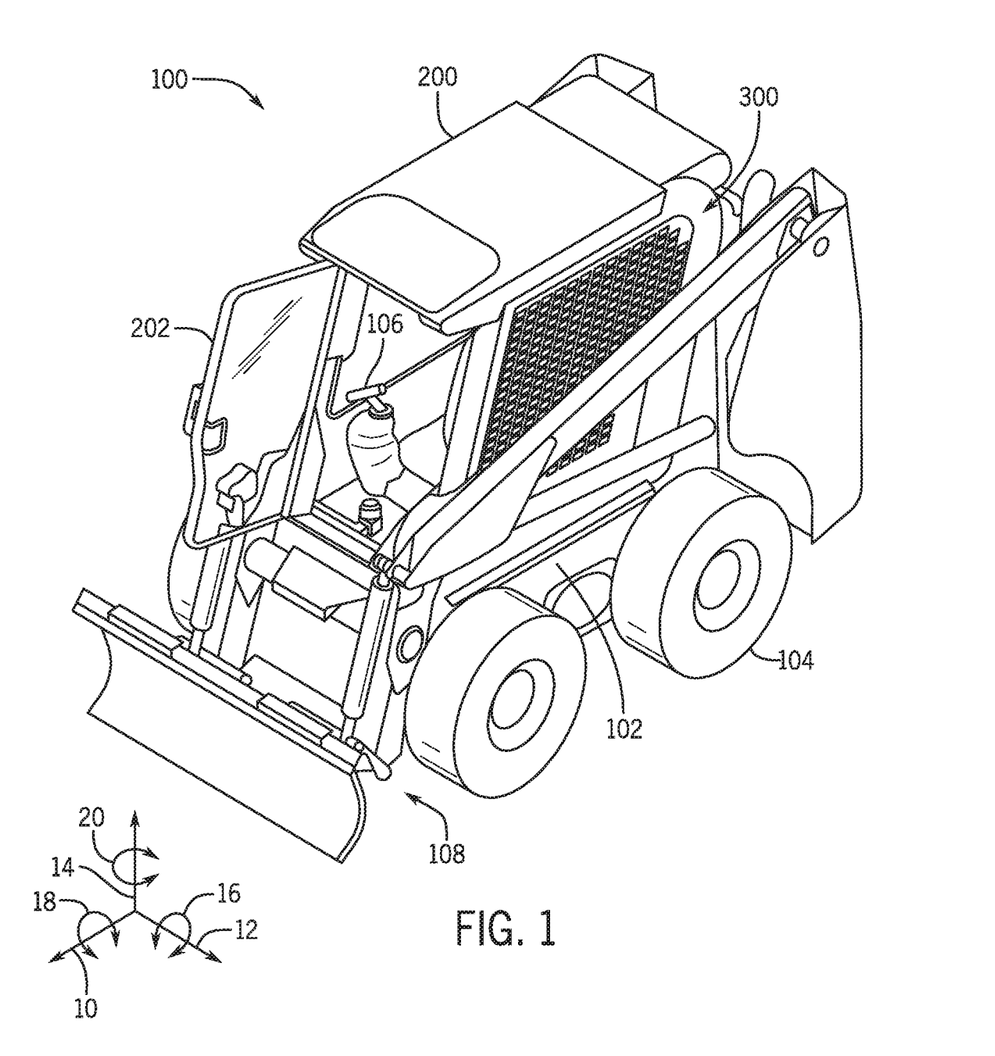
FIG. 1 is a perspective view of an embodiment of a work vehicle that includes a cab having a screen assembly.

Turning to the drawings, FIG. 1 is a perspective view of an embodiment of a work vehicle 100 that includes a cab 200 having a screen assembly 300. In the illustrated embodiment, the work vehicle 100 is a skid steer. However, it should be appreciated that the screen assembly disclosed herein may be utilized on cabs of other work vehicles, such as on-road trucks, tractors, harvesters, and construction equipment, among other work vehicles. In the illustrated embodiment, the work vehicle 100 includes a chassis 102. In certain embodiments, the chassis 102 is configured to house a motor (e.g., diesel engine, etc.), a hydraulic system (e.g., including a pump, valves, reservoir, etc.), and other components (e.g., an electrical system, a cooling system, etc.) that facilitate operation of the work vehicle. In addition, the chassis 102 is configured to support the cab 200 and wheels 104. The wheels 104 may be driven to rotate by the motor and/or by component(s) of the hydraulic system (e.g., hydraulic motor(s), etc.). While the illustrated work vehicle 100 includes wheels 104, in alternative embodiments, the work vehicle may include tracks or a combination of wheels and tracks.

The cab 200 is configured to house an operator of the work vehicle 100. Accordingly, various controls, such as the illustrated hand controller 106, are positioned within the cab 200 to facilitate operator control of the work vehicle 100. For example, the controls may enable the operator to control rotational speed of the wheels 104, thereby facilitating adjustment of the speed and/or orientation of the work vehicle 100. In addition, the controls may facilitate operator control of an implement, such as the illustrated blade 108. In the illustrated embodiment, the cab 200 also includes a door 202 to facilitate ingress and egress of the operator from the cab 200.

In certain embodiments, the screen assembly 300 includes a screen that covers a substantial portion of a respective opening in a frame of the cab 200. The screen is configured to block objects from entering the cab through the respective opening and/or impacting glass positioned between the screen and an interior of the cab 200. The screen is also configured to block an operator (e.g., a hand of an operator, etc.) from exiting the cab through the respective opening. As discussed in detail below, the screen assembly may also include a frame having at least one window channel and a screen channel. The at least one window channel is configured to support at least one window, the screen channel is configured to support the screen, and the frame extends about a portion of a periphery of the respective opening. Because the frame is configured to support both the window(s) and the screen, the cost of manufacturing the work vehicle may be substantially reduced (e.g., as compared to a configuration in which the screen is coupled to the cab frame separately from a window frame via multiple fasteners and/or a welded connection). Furthermore, the frame may facilitate removal of the screen via translation of the screen toward an open end of the frame (e.g., to facilitate access to the window(s)). As a result, the processing of removing the screen may be significantly less time consuming and expensive than removing a screen that is coupled directly to the cab frame by fasteners and/or a welded connection.

The screen assembly 300 and other elements of the work vehicle 100 may be described with reference to a coordinate system. The coordinate system includes a longitudinal axis 10 extending along a length of the work vehicle 100 (e.g., in a direction of travel of the work vehicle), a lateral axis 12 extending laterally outward from the longitudinal axis 10, and a vertical axis 14 extending upwardly from a plane formed by the longitudinal and lateral axes. In addition, the coordinate system includes rotational axes that may be used to describe rotation of elements of the work vehicle 100. The rotational axes includes a pitch axis 16, which represents rotation about the lateral axis 12, a roll axis 18, which represents rotation about the longitudinal axis 10, and a yaw axis 20, which represents rotation about the vertical axis 14.

Figure 2:
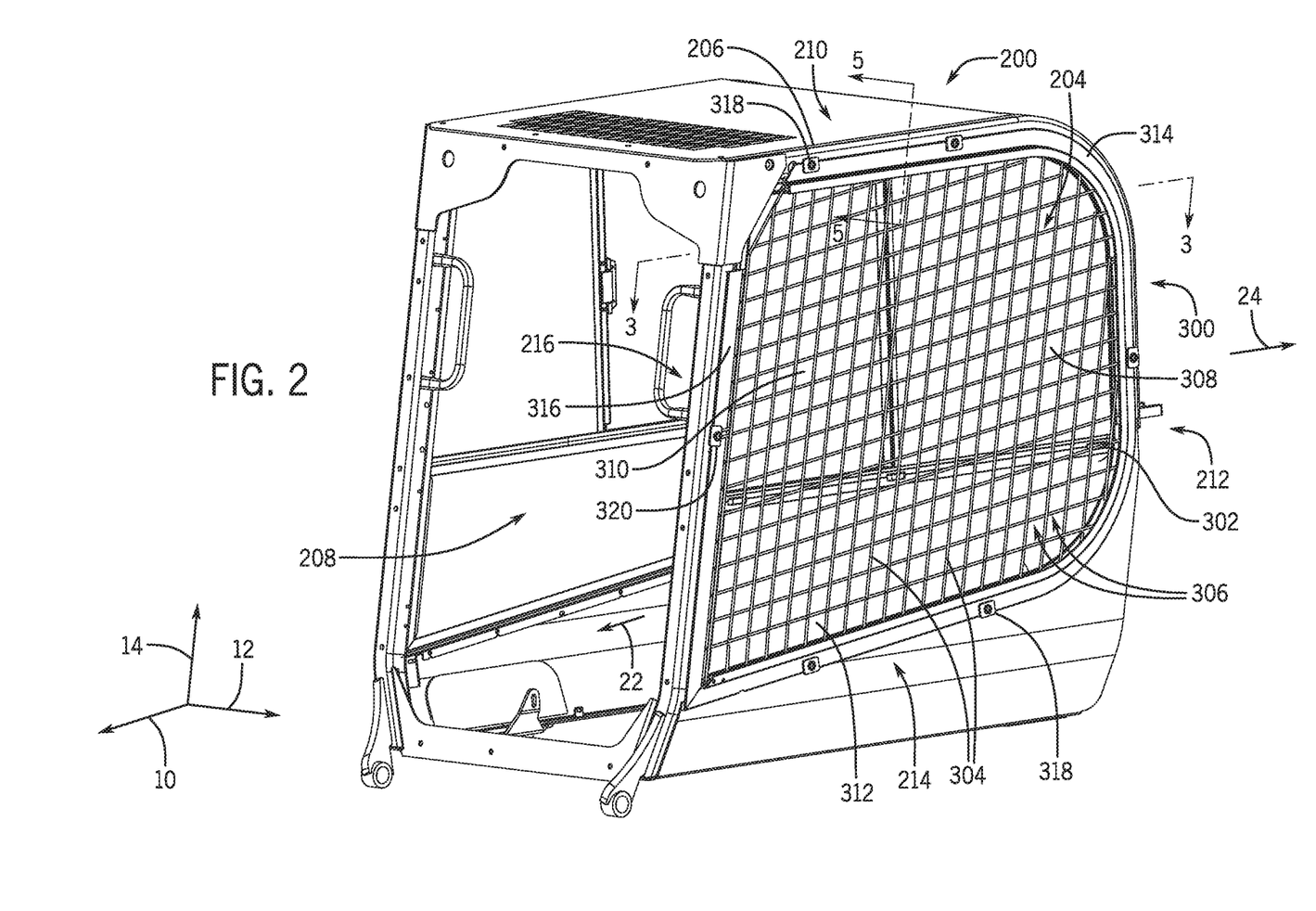
FIG. 2 is a perspective view of an embodiment of a cab that may be employed within the work vehicle of FIG. 1, in which the cab includes a screen assembly.

FIG. 2 is a perspective view of an embodiment of a cab 200 that may be employed within the work vehicle of FIG. 1, in which the cab 200 includes a screen assembly 300. As illustrated, the screen assembly 300 includes a screen 302 configured to cover at least a portion (e.g., a substantial portion) of an opening 204 in a frame 206 of the cab 200. In the illustrated embodiment, the screen 302 is formed from multiple member 304 coupled to one another to form multiple gaps 306 within the screen 302. For example, the screen may be formed from multiple substantially rigid wires (e.g., steel wires, etc.) arranged in a lattice pattern. The rigid wires may be coupled to one another (e.g., via resistance welding) at each intersection, thereby forming a substantially rigid screen. The screen 302 is configured to block objects (e.g., construct debris, rocks, tree limbs, etc.) from entering an interior 208 of the cab 200 and/or to block the operator (e.g., a hand of the operator) from exiting the cab through the opening 204. While the rigid wires are arranged in a lattice pattern in the illustrated embodiment, in other embodiments, the rigid wires may be arranged in another suitable pattern, such as a hub-and-spoke arrangement. In addition, while the illustrated screen is formed from rigid wires, in alternative embodiments, the screen may be formed from other suitable members, such as bars or plates, or the screen may be formed from a single member having multiple gaps/openings.

As used herein, covering a "substantial portion" of the opening refers to a screen 302 covering the opening 204 such that the size (e.g., length) of any gap between the peripheral edge of the opening and the screen is less than an object size threshold. Furthermore, as used herein, "object size threshold" refers to the minimum size (e.g., diameter, etc.) of an object that the screen is configured to block from entering or exiting the interior of the cab. The object size threshold may be based on the spacing and/or arrangement of the members that form the screen. By way of example, if the object size threshold of the screen is 5 cm, the screen is configured to block any object having a size (e.g., diameter) greater than or equal to 5 cm. In addition, if the screen covers a substantial portion of the opening, the size (e.g., length) of any gap between the peripheral edge of the opening and the screen is less than 5 cm. The object size threshold may be selected based on the expected working environment of the work vehicle. For example, the object size threshold may be 1 cm, 2 cm, 3 cm, 5 cm, 7 cm, 10 cm, or more.

In the illustrated embodiment, the screen assembly 300 also includes windows (e.g., transparent panels formed from glass or transparent plastic). The windows are configured to block airflow between the cab interior 208 and the external environment, thereby enabling a heating, ventilation, and air-conditioning (HVAC) system of the work vehicle to maintain a desired air temperature within the cab interior. As illustrated, the screen assembly 300 includes a first window 308, a second window 310, and a third window 312. In the illustrated embodiment, the first and third windows are fixed relative to the frame 206 of the cab 200. However, the second window 310 may open and close in response to movement of the window along the longitudinal axis 10. While the illustrated screen assembly includes three windows, in alternative embodiments, the screen assembly may include another suitable number of windows (e.g., 1, 2, 3, 4, 5, 6, or more). In addition, while the second window is movable between the open and closed positions in the illustrated embodiment, in other embodiments, one or more other windows may be movable, or the second window may be fixed relative to the cab frame.

In the illustrated embodiment, the screen assembly 300 includes a first frame 314 having two window channels and a screen channel. Each window channel is configured to support a respective window, and the screen channel is configured to support the screen 302. As illustrated, the first frame 314 extends about a first portion of a periphery of the opening 204. In addition, the screen assembly 300 includes a second frame 316 having two window channels. Each window channel of the second frame 316 is configured to support a respective window. As illustrated, the second frame 316 extends about a second portion of the periphery of the opening 204. Because the first frame 314 is configured to support both the windows and the screen, the cost of manufacturing the work vehicle may be substantially reduced (e.g., as compared to a configuration in which the screen is coupled to the cab frame separately from a window frame via multiple fasteners and/or a welded connection).

In the illustrated embodiment, the first frame 314 extends along a top edge 210 (e.g., relative to the ground) of the periphery of the opening 204, a rear edge 212 (e.g., relative to the direction of travel) of the periphery of the opening 204, and a bottom edge 214 (e.g., relative to the ground) of the periphery of the opening 204. In addition, the second frame 316 extends along a front edge 216 (e.g., relative to the direction of travel) of the periphery of the opening 204. However, in alternative embodiments, the first frame may extend along other edge(s) of the periphery of the opening (e.g., along the top edge, along the front edge, and along the rear edge; along the front edge, along the top edge, and along the bottom edge; etc.), and the second frame may extend along a suitable complementary edge of the periphery of the opening. While the first frame extends along three edge of the periphery, and the second frame extends along one edge of the periphery, in alternative embodiments, the first frame and/or the second frame may extend along other suitable numbers of edges (e.g., the first frame may extend along one or two edges, the second frame may extend along one or two edges, each frame may extend along two edges, etc.). Furthermore, in certain embodiments, at least one frame may extend along a portion of an edge of the periphery of the opening.

In the illustrated embodiment, the first frame 314 of the screen assembly 300 is coupled to the cab frame 206 by fastening assemblies 318. Each fastening assembly 318 includes a fastener and a mounting element. In certain embodiments, each mounting element includes a protrusion configured to engage a corresponding recess in the first frame, thereby facilitating alignment of the mounting element with the first frame. The fastener (e.g., bolt, screw, etc.) extends through the mounting element and the first frame of the screen assembly, and engages the cab frame, thereby coupling the first frame to the cab frame. While each fastening assembly includes a mounting element and a fastener in the illustrated embodiment, in alternative embodiments, other types of fastening assemblies may be utilized to couple the first frame to the frame of the cab, such as clips, latches, or magnets, among others. Furthermore, while five fastening assemblies are utilized to couple the first frame to the frame of the cab in the illustrated embodiment, in other embodiments, more or fewer fastening assemblies may be utilized (e.g., 1, 2, 3, 4, 5, 6, 7, 8, or more).

In the illustrated embodiment, the second frame 316 of the screen assembly 300 is coupled to the cab frame 206 by a fastening assembly 320. The fastening assembly 320 includes a fastener and a mounting element. In certain embodiments, the mounting element includes a protrusion configured to engage a corresponding recess in the second frame, thereby facilitating alignment of the mounting element with the second frame. The fastener (e.g., bolt, screw, etc.) extends through the mounting element and the second frame of the screen assembly, and engages the cab frame, thereby coupling the second frame to the cab frame. In addition, the fastening assembly 320 is configured to couple the screen 302 to the second frame 316 to block movement of the screen 302 relative to the first and second frames. In the illustrated embodiment, the fastener extends through a loop in the screen to couple the screen to the second frame. While the fastening assembly includes a mounting element and a fastener in the illustrated embodiment, in alternative embodiments, another type of fastening assembly may be utilized to couple the screen to the second frame and the second frame to the frame of the cab, such as a clip assembly, a latch assembly, or a magnet assembly, among others. Furthermore, while one fastening assembly is utilized to couple the screen to the second frame and the second frame to the frame of the cab in the illustrated embodiment, in other embodiments, more or fewer fastening assemblies may be utilized (e.g., 1, 2, 3, 4, 5, 6, 7, 8, or more). In addition, while a single fastening assembly is utilized to couple the screen to the second frame and the second frame to the cab frame, in alternative embodiments, a first fastening assembly may be utilized to couple the screen to the second frame, and a second fastening assembly may be utilized to couple the second frame to the cab frame.

To remove the screen 302 from the frames, the fastener of the second fastening assembly 320 may be removed. The screen 302 may then be translated in a forward direction 22 (e.g., relative to the direction of travel) along the longitudinal axis 10 through an open end of the first frame 314, thereby providing access to the windows. Because the screen may be removed from the cab frame by uncoupling a single fastener and translating the screen, the process of removing the screen may be significantly less time consuming and expensive (e.g., as compared to the process of removing a screen that is coupled to the cab frame by multiple fasteners and/or a welded connection). The screen 302 may be replaced by aligning the screen with the screen channel in the first frame 314, and then translating the screen in a rearward direction 24 (e.g., relative to the direction of travel) along the longitudinal axis 10. The fastener of the fastening assembly 320 may then be inserted through the loop of the screen and through the mounting element, and engaged with the frame member of the cab (e.g., inserted into a corresponding fastener coupled to the frame member), thereby securing the screen to the cab frame 206.

In certain embodiments, the first frame 314 and/or the second frame 316 may be formed from extruded aluminum. However, in further embodiments, at least one of the frames may be formed from another suitable material, such as a composite material or an injection molded polymeric material, among others. While a screen assembly on a left side of the work vehicle is described herein, a screen assembly on a right side of the work vehicle may include any or all of the features disclosed herein with reference to the left side screen assembly. In addition, in certain embodiments, the work vehicle may include other and/or additional screen assembly/assemblies positioned at any suitable opening(s) of the work vehicle cab, such as a rear opening, among others.

Figure 3:
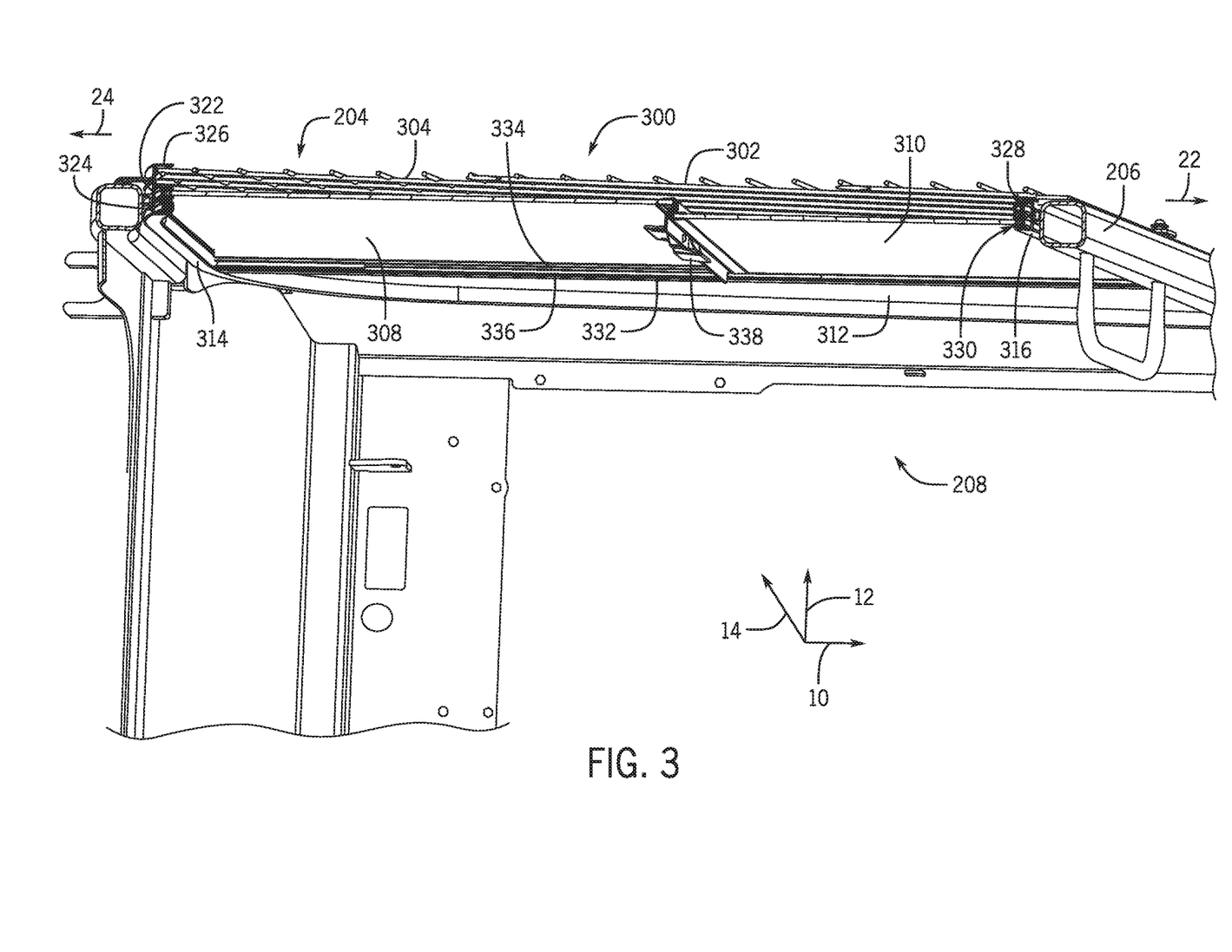
FIG. 3 is a cross-sectional perspective view of the screen assembly of FIG. 2, taken along line 3-3 of FIG. 2.

FIG. 3 is a cross-sectional perspective view of the screen assembly 300 of FIG. 2, taken along line 3-3 of FIG. 2. In the illustrated embodiment, the first frame 314 includes a first window channel 322, a second window channel 324, and a screen channel 326. The first window channel 322 is configured to support the first window 308 (e.g., by receiving the first window 308), the second window channel 324 is configured to support the second window 310 (e.g., by receiving the second window 310), and the screen channel 326 is configured to support the screen 302 (e.g., by receiving the screen 302). In addition, the second frame 316 includes a first window channel 328 and a second window channel 330. The second window channel 330 is configured to support the second window 310 (e.g., by receiving the second window 310). In the illustrated embodiment, the first frame 314 and the second frame 316 are aligned with one another along the lateral axis 12, thereby enabling the second window channel 324 of the first frame 314 and the second window channel 330 of the second frame 316 to support the second window 310.

In the illustrated embodiment, the screen assembly 300 includes a third frame 332 having a first window channel 334 and a second window channel 336. The first window channel 334 is configured to support the first window 308 (e.g., by receiving the first window 308), and the second window channel 336 is configured to support the second window 310 (e.g., by receiving the second window 310). The third frame 332 is positioned between the third window 312 and the first and second windows. In certain embodiments, the third frame 332 includes third and fourth window channels that face downwardly relative to the ground. In such embodiments, the third frame may also support the third window 312. For example, in certain embodiments, a window insert may extend into the third and fourth channels of the third frame and engage the third window. In addition, a window insert may extend into the first and second channels of the first frame at the location of the third window and engage the third window. A window insert may also extend into the first and second channels of the second frame at the location of the third window and engage the third window. The window inserts may secure the third window 312 to the first, second, and third window frames.

In the illustrated embodiment, the first window channel 322 of the first frame 314 and the first window channel 334 of the third frame 332 are configured to support the first window 308 (e.g., by receiving the first window 308), thereby coupling the first window 308 to the frames. In addition, the second window channel 324 of the first frame 314 and the second window channel 336 of the third frame 332 are configured to support the second window 310 (e.g., by receiving the second window 310), thereby coupling the second window 310 to the frames. Furthermore, the second window channel 330 of the second frame 316 is configured to support the second window 310 (e.g., by receiving the second window 310) while the second window 310 is in the illustrated closed position. The second window 310 may be transitioned from the illustrated closed position to an open position by disengaging a latch assembly 338 and translating the second window 310 in the rearward direction 24 along the longitudinal axis 10. The second window channels of the first and third frames may enable the second window to slide between the closed and open positions. Opening the second window may enable an operator to communicate with people outside of the work vehicle and/or may enable fresh air to enter the interior 208 of the cab. To close the second window 310, the second window 310 may be translated in the forward direction 22 along the longitudinal axis 10 until the second window 310 engages the second window channel 330 of the second frame 316. Closing the second window 310 may automatically engage the latch assembly 338.

While the illustrated screen assembly includes a latch assembly to secure the second window in the closed position, in other embodiments, the latch assembly may be omitted. Furthermore, while the second window is configured to transition between the closed and open positions in the illustrated embodiment, in other embodiments, the second window may be non-movably coupled to the frame(s). Furthermore, while the screen assembly includes three window in the illustrated embodiment, in other embodiments, the screen assembly may include more or fewer windows (e.g., 1, 2, 3, 4, 5, 6, or more). For example, in certain embodiments, the screen assembly may include two windows (e.g., the first and second windows). In such embodiments, the third frame may be omitted. In further embodiments, the screen assembly may include two movable windows and one fixed window. In such embodiments, at least one frame may include three window channels to support the three windows and to facilitate movement of the two movable windows. Furthermore, in certain embodiments, each frame may include more or fewer window channels.

Figure 4:
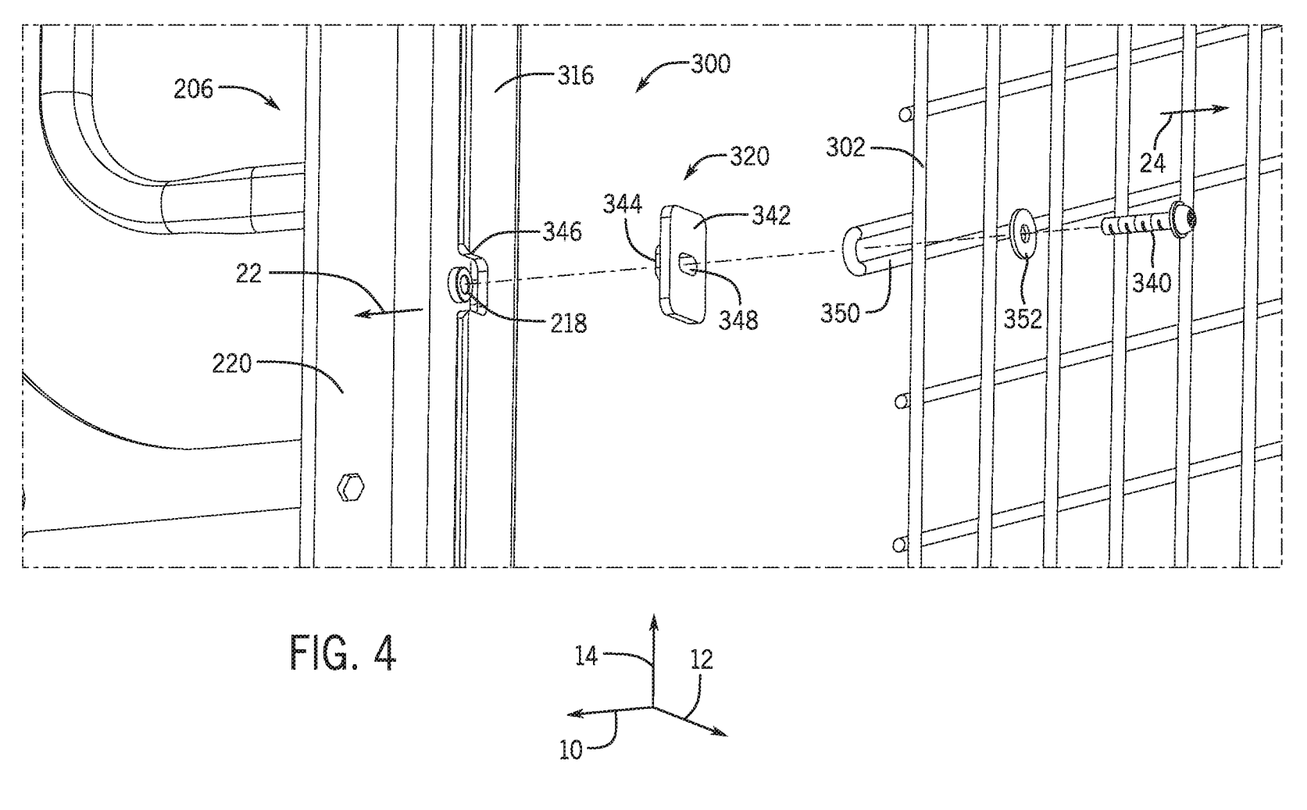
FIG. 4 is an exploded view of a fastening assembly of the screen assembly of FIG. 2.

FIG. 4 is an exploded view of a fastening assembly 320 of the screen assembly 300 of FIG. 2. In the illustrated embodiment, the fastening assembly 320 includes a fastener 340 and a mounting element 342. As illustrated, the mounting element 342 includes a protrusion 344 configured to engage a corresponding recess 346 in the second frame 316, thereby facilitating alignment of the mounting element 342 with the second frame 316. The fastener 340 (e.g., bolt, screw, etc.) is configured to extend through an opening 348 in the mounting element 342 and to engage a corresponding fastener 218 (e.g., nut, clip, etc.) coupled to a frame member 220 of the cab frame 206, thereby coupling the second frame 316 to the cab frame 206. In addition, the fastening assembly 320 is configured to couple the screen 302 to the second frame 316 to block movement of the screen 302 relative to the first and second frames. In the illustrated embodiment, the fastener 340 is configured to extend through a loop 350 in the screen 302 to couple the screen 302 to the second frame 316. As illustrated, a washer 352 is configured to be positioned between a head of the fastener 340 and the loop 350. Accordingly, while the fastener 340 is engaged with the corresponding fastener 218, the head of the fastener 340 secures the loop 350 between the washer 352 and the mounting element 342, thereby coupling the screen 302 to the first and second frames.

While the illustrated embodiment includes a washer 352 configured to be disposed between the head of the fastener 340 and the mounting element 342, in alternative embodiments, the washer may be omitted. Furthermore, while the fastener 340 engages the loop 350 of the screen 302 in the illustrated embodiment, in other embodiments, the fastener 340 may engage another portion of the screen. In addition, while the fastening assembly 320 includes a mounting element 342 and a fastener 340 in the illustrated embodiment, in alternative embodiments, another type of fastening assembly may be utilized to couple the screen to the second frame and the second frame to the frame of the cab, such as a clip assembly, a latch assembly, or a magnet assembly, among others. Furthermore, while one fastening assembly 320 is utilized to couple the screen 302 to the second frame 316 and the second frame 316 to the frame 206 of the cab in the illustrated embodiment, in other embodiments, more or fewer fastening assemblies may be utilized (e.g., 1, 2, 3, 4, 5, 6, 7, 8, or more). In addition, while a single fastening assembly 320 is utilized to couple the screen 302 to the second frame 316 and the second frame 316 to the cab frame, in alternative embodiments, a first fastening assembly may be utilized to couple the screen to the second frame, and a second fastening assembly may be utilized to couple the second frame to the cab frame.

To remove the screen 302 from the first and second frames, the fastener 340 may be removed. The screen 302 may then be translated in the forward direction 22 (e.g., relative to the direction of travel) along the longitudinal axis 10, thereby providing access to the windows. The screen 302 may be replaced by aligning the screen with the screen channel in the first frame 314, and then translating the screen in the rearward direction 24 (e.g., relative to the direction of travel) along the longitudinal axis 10. The fastener 340 may then be inserted through the loop 350 of the screen 302, through the opening 348 in the mounting element 342, and into the corresponding fastener 218 coupled to the frame member 220, thereby securing the screen 302 to the cab frame 206.

Figure 5:
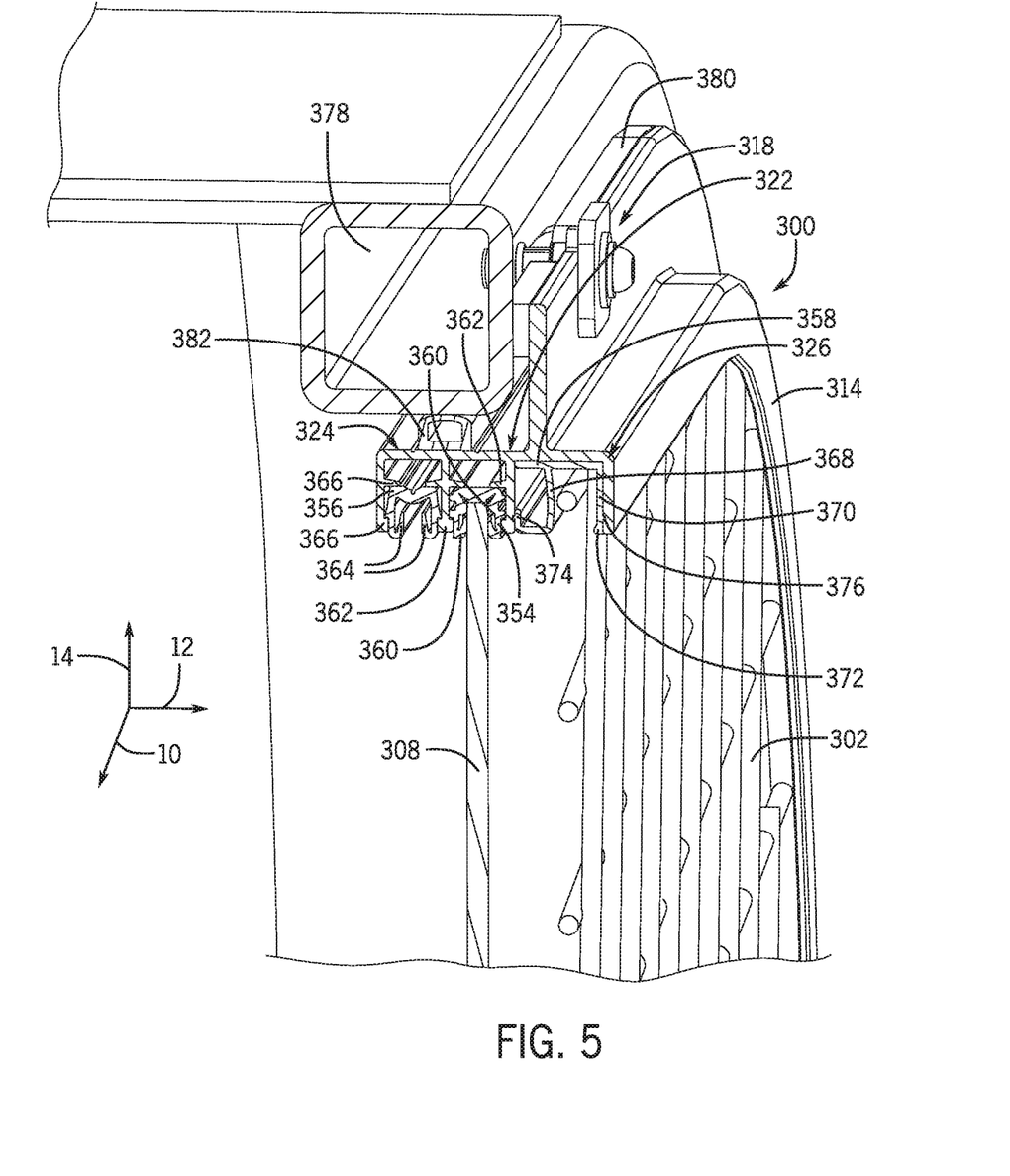
FIG. 5 is a cross-sectional perspective view of the screen assembly of FIG. 2, taken along line 5-5 of FIG. 2.

FIG. 5 is a cross-sectional perspective view of the screen assembly 300 of FIG. 2, taken along line 5-5 of FIG. 2. As indicated above, the first frame 314 includes the first window channel 322, the second window channel 324, and the screen channel 326. In the illustrated embodiment, the first window channel 322 is configured to receive the first window 308, the second window channel 324 is configured to receive the second window, and the screen channel 326 is configured to receive the screen 302. In addition, a first window insert 354 is disposed within the first window channel 322, a second window insert 356 is disposed within the second window channel 324, and a screen insert 358 is disposed within the screen channel 326. Each insert may be configured to reduce lateral movement (e.g., movement along the lateral axis 12) of the window/screen within the respective channel and/or to substantially reduce or eliminate the possibility of contact between the window/screen and the respective channel, thereby reducing noise (e.g., rattling) due to vibrations of the work vehicle.

In the illustrated embodiment, the first window insert 354 includes multiple protrusions 360 configured to engage the first window 308, thereby coupling the first window 308 to the first frame 314. The number of protrusions and/or the resilience of each protrusion may be particularly selected based on the thickness and/or the texture of the first window, among other factors. In the illustrated embodiment, retaining protrusions 362 engage the first window insert 354 to secure the first window insert 354 within the first window channel 322. However, in alternative embodiments, the first window insert may be secured within the first window channel by other suitable connection systems (e.g., fasteners, clips, etc.). In certain embodiments, the first window insert may be formed from a resilient material (e.g., polyurethane, polyvinyl chloride (PVC), etc.). Furthermore, the first window insert may extend along an entire extent of the first window channel, or the first window insert may extend along one or more portions of the first window channel (e.g., a first section of the insert may extend along a top portion, a second section of the insert may extend along a rear portion, and a third section of the insert may extend along a bottom portion). While the illustrated insert is configured to receive the first window within the first window channel, in other embodiments, the first window insert may be disposed within the first window channel and configured to receive the first window outside of the first window channel, thereby enabling the first window channel to support the first window.

In the illustrated embodiment, the second window insert 356 includes multiple protrusions 364 configured to engage the second window, thereby coupling the second window to the first frame 314 and enabling the second window to slide relative to the first frame 314. The number of protrusions and/or the resilience of each protrusion may be particularly selected based on the thickness of the second window, the texture of the second window, a target resistance to movement of the second window along the longitudinal axis, or a combination thereof, among other factors. In the illustrated embodiment, retaining protrusions 366 engage the second window insert 356 to secure the second window insert 356 within the second window channel 324. However, in alternative embodiments, the second window insert may be secured within the second window channel by other suitable connection systems (e.g., fasteners, clips, etc.). In certain embodiments, the second window insert may be formed from a resilient material (e.g., polyurethane, polyvinyl chloride (PVC), etc.). Furthermore, the second window insert may extend along an entire extent of the second window channel, or the second window insert may extend along one or more portions of the second window channel (e.g., a first section of the insert may extend along a top portion, a second section of the insert may extend along a rear portion, and a third section of the insert may extend along a bottom portion). While the illustrated insert is configured to receive the second window within the second window channel, in other embodiments, the second window insert may be disposed within the second window channel and configured to receive the second window outside of the second window channel, thereby enabling the second window channel to support the second window.

In the illustrated embodiment, the screen insert 358 includes a finger 368 configured to urge the screen 302 against a wall 370 of the screen insert 358, thereby coupling the screen 302 to the first frame 314 and reducing lateral movement of the screen 302 (e.g., movement along the lateral axis 12) relative to the first frame 314. As illustrated, the wall 370 includes a ridge 372 configured to engage the screen 302. However, in alternative embodiments, the ridge may be omitted. The shape and/or resilience of the finger 368 may be particularly selected based on the thickness of the screen 302 and/or a target resistance to movement of the screen 302 along the longitudinal axis 10, among other factors. In addition, while the illustrated screen insert 358 includes a single finger 368, in other embodiments, the screen insert may include additional fingers configured to engage the screen (e.g., a finger on each lateral side of the screen, etc.). In further embodiments, the screen insert may include other and/or additional features (e.g., protrusions) configured to engage the screen to couple the screen to the first frame and/or to reduce lateral movement of the screen relative to the first frame. In the illustrated embodiment, retaining protrusions 374 of the screen insert 358 engage corresponding recesses 376 within the first frame 314 to secure the screen insert 358 within the screen channel 326. However, in alternative embodiments, the screen insert may be secured within the screen channel by other suitable connection systems (e.g., fasteners, clips, etc.). In certain embodiments, the screen insert may be formed from a resilient material (e.g., polyurethane, polyvinyl chloride (PVC), etc.). Furthermore, the screen insert may extend along an entire extent of the screen channel, or the screen insert may extend along one or more portions of the screen channel (e.g., a first section of the insert may extend along a top portion, a second section of the insert may extend along a rear portion, and a third section of the insert may extend along a bottom portion). While the illustrated insert is configured to receive the screen within the screen channel, in other embodiments, the screen insert may be disposed within the screen channel and configured to receive the screen outside of the screen channel, thereby enabling the screen channel to support the screen.

As illustrated, the first frame 314 is coupled to a frame member 378 of the cab frame 206 by a fastening assembly 318. In addition, a first seal 380 is disposed between the first frame 314 and the frame member 378 along the lateral axis 12. The first seal 380 is configured to substantially reduce or eliminate contact between the first frame 314 and the frame member 378, thereby reducing noise (e.g., rattling). The first seal 380 is also configured to block debris and/or liquids (e.g., rain) from entering the interior of the cab. Furthermore, a second seal 382 is disposed between the first frame 314 and the frame member 378 along the vertical axis 14. The second seal 382 is configured to substantially reduce or eliminate contact between the first frame 314 and the frame member 378, thereby reducing noise (e.g., rattling). The second seal 382 is also configured to substantially block airflow between the cab and the external environment, thereby increase the efficiency of the HVAC system.

While a window/screen insert is disposed within each channel of the first frame in the illustrated embodiment, in other embodiments, at least one window/screen insert may be omitted. For example, in certain embodiments, the first frame may include integrated protrusions extending inwardly into at least one channel and configured to engage the window(s)/screen (e.g., in embodiments in which the first frame is formed from a polymeric material). In such embodiments, the integrated protrusions may couple the window(s)/screen to the first frame and/or reduce lateral movement of the window(s)/screen within the respective channel(s). Furthermore, while the window inserts are described above with reference to the channels of the first frame, window insert(s) (e.g., similar to or different from the window inserts described above) may be employed within one or more channels of the second frame. In addition, while the screen is coupled to the first frame via the screen channel in the illustrated embodiment, in other embodiments, the screen may be coupled to the first frame by other suitable connection(s). For example, in certain embodiments, the screen may be coupled to the first frame by fasteners and/or clips. In such embodiments, during construction of the work vehicle, the first frame, with the screen coupled to the first frame, may be coupled to the frame of the cab to cover the opening. As such, the process of manufacturing the work vehicle may be less time consuming and/or expensive (e.g., as compared to a process involving coupling a window frame to the cab frame and then coupling a screen to the cab frame).

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A screen assembly for a work vehicle cab, comprising:
at least one window;
a screen; and
a frame at least partially disposable within an opening in the work vehicle cab and at least partially defining a frame opening, the frame comprising at least one window channel and a screen channel, the at least one window channel configured to support the at least one window within the frame opening, the screen channel configured to support the screen within the frame opening.

2. The screen assembly of claim 1, wherein the screen channel is positioned outwardly from the at least one window channel relative to an interior of the work vehicle cab.

3. The screen assembly of claim 1, wherein the screen comprises a plurality of members coupled to one another to form a plurality of gaps within the screen.

4. The screen assembly of claim 1, comprising a resilient insert disposed within the screen channel, wherein the resilient insert is configured to reduce movement of the screen relative to the frame.

5. The screen assembly of claim 1, comprising a fastening assembly configured to couple the frame to a frame member of the work vehicle cab.

6. The screen assembly of claim 1, wherein the at least one window channel comprises a first window channel configured to receive a first window of the at least one window and a second window channel configured to receive a second window of the at least one window.

7. A screen assembly for a work vehicle cab, comprising:
at least one window;
a screen;
a first frame at least partially disposable within an opening in the work vehicle cab and at least partially defining a frame opening, the first frame comprising at least one window channel and a screen channel, the at least one window channel of the first frame configured to support the at least one window within the frame opening, the screen channel of the first frame configured to support the screen within the frame opening, the first frame extending about a first portion of a periphery of the opening in the work vehicle cab;
a second frame comprising at least one window channel, the at least one window channel of the second frame configured to support the at least one window, the second frame extending about a second portion of the periphery of the opening in the work vehicle cab; and
a fastening assembly configured to couple the screen to the second frame to block movement of the screen relative to the first frame and the second frame, the fastening assembly comprising a fastener.

8. The screen assembly of claim 7, wherein the fastening assembly is configured to couple the second frame to a frame member of the work vehicle cab.

9. The screen assembly of claim 7, wherein the fastening assembly comprises a fastener and a mounting element, the mounting element includes a protrusion configured to engage a recess in the second frame, the fastener is configured to extend through the mounting element and a loop in the screen, and the fastener is configured to engage a frame member of the work vehicle cab.

10. The screen assembly of claim 7, wherein the screen comprises a plurality of members coupled to one another to form a plurality of gaps within the screen.

11. The screen assembly of claim 7, comprising a resilient insert disposed within the screen channel of the first frame, wherein the resilient insert is configured to reduce movement of the screen relative to the first frame.

12. The screen assembly of claim 1, wherein the frame is a first frame having a first end and a second end, the screen assembly further comprising a second frame comprising at least one window channel, the second frame having a first end and a second end, the first ends of the first and second ends disposed adjacent one another and the second ends of the first and second frames disposed adjacent one another to hold the screen within the screen channels of the first and second frames, the screen assembly further comprising a fastener configured to fasten the screen to the second frame.

13. The screen assembly of claim 12, wherein the screen is slidably removable from the first frame when the fastener is removed.

14. The screen assembly of claim 7, wherein the screen is slidably removable from the first frame when the fastener is removed.

* * * * *